US012770131B2

(12) United States Patent
Behera et al.

(10) Patent No.: US 12,770,131 B2
(45) Date of Patent: Oct. 20, 2026

(54) DYNAMIC PAYMENT QUICK RESPONSE ("QR") CODES

(71) Applicant: Bank of America Corporation, Charlotte, NC (US)

(72) Inventors: Abhijit Behera, Hyderabad (IN); Maneesh Sethia, Hyderabad (IN); Rajini Bandargallu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 45 days.

(21) Appl. No.: 18/636,415

(22) Filed: Apr. 16, 2024

(65) Prior Publication Data

US 2025/0322381 A1 Oct. 16, 2025

(51) Int. Cl.
*G06Q 40/00* (2023.01)
*G06K 7/14* (2006.01)
*G06Q 20/32* (2012.01)

(52) U.S. Cl.
CPC ....... *G06Q 20/3274* (2013.01); *G06K 7/1417* (2013.01)

(58) Field of Classification Search
CPC ........... G06Q 20/3274; G06Q 20/3276; G06K 7/1417
See application file for complete search history.

(56) References Cited

U.S. PATENT DOCUMENTS 8,868,927 B1 * 10/2014 Lee .......................... G06F 11/30 726/4
2008/0222048 A1 * 9/2008 Higgins .................... G07G 1/14 705/67
2016/0125388 A1 * 5/2016 Gao ................... G06Q 20/0855 705/73
2019/0130386 A1 * 5/2019 Bhat .................... G06Q 20/367
(Continued)

FOREIGN PATENT DOCUMENTS

GB 2512944 A * 10/2014 ............. G06Q 20/20

OTHER PUBLICATIONS

Mainetti et al: "A Sustainable Approach to Delivering Programmable Peer-to-Peer Offline Payments", ISSN: 1424-8220 , 1424-3210; DOI: 10.3390/s23031336, Sensors, 2023, vol. 23(3), p. 1336 (Year: 2023).*

*Primary Examiner* — Edward J Baird
(74) *Attorney, Agent, or Firm* — Weiss & Arons LLP

(57) ABSTRACT

Methods, systems and apparatus for processing and executing offline transactions between a customer and a vendor are provided. Methods may include using a customer device to log into a customer account on an entity-operated application without an internet connection. The methods may include using an artificial intelligence ("AI") model to generate a quick response ("QR") code using data from previous transactions. The QR code may include a transaction payload with a selected value of funds. The methods may include scanning the QR code using a vendor scanning device. The methods may include transmitting the QR code
(Continued)

to a central vendor platform. The methods may include creating an encrypted data packet by extracting data from the QR code. When an internet connection is established, the methods may include executing, at an entity-operated platform, a transfer of funds between the customer account and the vendor corresponding to a payment amount.

7 Claims, 8 Drawing Sheets

(56) References Cited

U.S. PATENT DOCUMENTS

| | | | | |
|---|---|---|---|---|
| 2020/0034821 | A1* | 1/2020 | Agrawal | H04L 9/3273 |
| 2021/0241269 | A1* | 8/2021 | Dunjic | G06Q 10/0838 |
| 2022/0147970 | A1* | 5/2022 | Babcock | G06Q 20/4016 |
| 2022/0240093 | A1* | 7/2022 | Bora | H04B 17/318 |
| 2022/0366383 | A1* | 11/2022 | Melcer | G06Q 20/326 |
| 2023/0032201 | A1* | 2/2023 | Waher | G06Q 20/10 |
| 2023/0034841 | A1* | 2/2023 | Pathak | G06K 7/1417 |

* cited by examiner

DYNAMIC PAYMENT QUICK RESPONSE ("QR") CODES

FIELD OF TECHNOLOGY

Aspects of the disclosure relate to offline transactions.

BACKGROUND OF THE DISCLOSURE

Online transactions are generally dependent on availability of network infrastructure and internet connectivity. However, network infrastructure and internet connectivity are not always available, at times, in all locations. Additionally, during emergencies availability of network infrastructure may be compromised and internet connectivity may not be accessible.

Online transactions often require authentication mechanisms that rely on real-time verification, such as one-time passwords ("OTPs") or biometric scans. When a customer or a vendor does not have access to the internet and/or has limited access to the internet, these authentication mechanisms may not be accessible. Without an operational internet connection, online transactions may not be able to be processed. Incomplete processing of the transactions lead to failed transactions and inconveniences for both the user and the vendor.

Therefore, it may be desirable to provide a system to enable a customer to complete transactions without internet connectivity. It may also be desirable to provide a system for vendors to process transactions without internet connectivity.

SUMMARY OF THE DISCLOSURE

Systems, apparatus and methods for processing and executing offline transactions between a customer and a vendor are provided.

The methods may include creating an offline resource transfer system. The methods may create the offline resource transfer system using a customer device. The customer device may be a computing device. The customer device may be a mobile computing device. The customer device may be a smartphone, tablet, personal digital assistant ("PDA") and/or any other suitable mobile device. The customer device may be associated with the customer.

Creating the offline resource transfer system may include logging into a customer account on an entity-operated application. The entity-operated application may be a software application. The entity-operated application may be operated by an entity. The customer account may be an identity/authenticator created for the customer. The customer account may link the customer, via customer credentials, to the entity. The customer credentials may include a username, a password and/or any other suitable customer credentials. The customer account may enable the customer to access customer specific settings, customer-related data and/or any other suitable entity-related data on the customer device.

For example, the entity may be a financial institution. The customer account may be a customer-specific financial account. The customer-specific financial account may include an amount funds present in the customer account, customized financial control settings, credit card statements and/or any suitable customer financial data.

The entity-operated application may be accessed without an internet connection. The entity-operated application may be accessed when the customer device does not have access to the internet. The customer may select a value of funds using the entity-operated application. The value of funds may be an amount of funds that the customer may want to transfer from the customer account. The value of funds may be an amount of funds that the customer may want to use in a future transaction. The value of funds may be an amount of resources. The entity-operated application may create a transaction payload including the value of funds.

The entity-operated application may generate a quick response ("QR") code. The QR code may include an arrangement of a series of black and white pixels in a unique pattern. The unique pattern may encode a string of data. When scanned, the unique pattern may be decoded to translate the string of data into machine-readable information. The black and white pixels may be data fields. Data may be encrypted into the data fields.

The QR code may be generated using an artificial intelligence model. The AI model may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI model may update the progressive learning algorithms based on the generated outputs curated/retrieved from the analyzed correlations and patterns.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and generate outputs.

The AI model may access a data log of the entity-operated application. The AI model may access the data log of the entity-operated application by retrieving it from a memory module associated with the customer device. The memory module may include random access memory ("RAM"), read only memory ("ROM"), electrically erasable programmable read-only memory ("EEPROM"), flash memory, cache memory and/or any suitable memory module.

The AI model may identify metadata of a most recent transaction in the data log. The metadata may be stored in the data log. The AI model may identify metadata of the most recent transaction in the data log from the memory module.

The methods may include retrieving customer account information from the metadata. The methods may include using the AI model to retrieve customer account information from the metadata. The customer account information may include a customer account identification number, an entity routing number, a most recent value of funds included in the customer account and/or any suitable customer account information. The customer account information may have been used to execute the most recent transaction.

The AI model may use the customer account information and the transaction payload to generate the QR code. The AI model may encode the customer account information and the transaction payload in the black and white pixels of the QR code.

In some embodiments, creating an offline resource transfer system may include logging into the customer account via an internet connection. The methods may include using the entity-operated application to select from the customer account a value of funds. The methods may include generating using the entity-operated application, a transaction payload including based on the selected value of funds. The methods may include using the entity-operated application to generate a QR code. The QR code may include the transaction payload. The methods may include downloading the QR code from the entity-operated application onto the customer device.

The methods may include displaying the QR code on a user interface ("UI") of the customer device. The methods may include initiating a transaction between the customer and the vendor. The transaction may be performed between the customer and the vendor without an internet connection. Initiating the transaction may include connecting the customer device to a vendor scanning device via a local connection. Local connections may be initiated using Bluetooth, Wi-Fi, iBeacon™ and/or any other suitable protocol. Local connections may be initiated using wired connections. Local connections may be initiated using wireless connections.

The vendor scanning device may be a scanner, point of sale ("PoS") device, chip reader and/or any suitable computing device with scanning capabilities. The vendor scanning device may include a radio frequency identification ("RFID") reader, near field communication ("NFC") reader and/or any contactless receiver that may enable wireless connections. The vendor scanning device may include an RFID tag, an NFC tag and/or any contactless transmitter that may enable wireless connections. The vendor scanning device may include universal serial bus ("USB") cables, micro-USB cables, USB-C cables and/or any other suitable connection cables that may enable wired connections. The vendor scanning device may include USB ports, micro-USB ports, USB-C ports and/or any other suitable connection ports that may enable wired connections.

The customer device may include an RFID reader, an NFC reader and/or any contactless receiver that may enable wireless connections. The customer device may include an RFID tag, an NFC tag and/or any contactless transmitter that may enable wireless connections. The customer device may include USB cables, micro-USB cables, USB-C cables and/or any other suitable connection cables that may enable wired connections. The customer may include USB ports, micro-USB ports, USB-C ports and/or any other suitable connection ports that may enable wired connections.

The vendor scanning device may create a local connection with the customer device via the above mentioned wired and/or wireless connections. Once a local connection has been initiated, the customer device may receive a payment amount from the vendor scanning device. The payment amount may be a portion of the value of funds to be transmitted to the vendor. The payment amount may be any suitable amount of resources to be transferred to the vendor in exchange for a product, service and/or any suitable return from the vendor.

After receiving the payment amount from the vendor scanning device, the methods may include determining at the customer device, whether the payment amount is greater than the value of funds included in the transaction payload. In response to determining that the payment amount is greater than the value of funds, the methods may include preventing, at the customer device, the transaction from executing. In response to determining that the payment amount is less than or equal to the value of funds, the methods may include enabling, at the customer device, the transaction to be executed.

The methods may include updating the transaction payload included in the QR code. The update may be based on the payment amount received from the vendor. The updating may include setting aside the portion of the value of funds from the value of funds included in the transaction payload.

The methods may include scanning the QR code using a vendor scanning device. The vendor scanning device may be a point-of-sale ("PoS") device, a scanner and/or any other suitable computing device. The vendor scanning device may include a camera, photosensor and/or any other suitable scanning mechanism. The methods may include scanning the QR code via the camera, photosensor and/or any other suitable scanning mechanism. The vendor scanning device may capture a finder pattern of the QR code. The finder pattern may include a pattern of black squares that may be used to locate the QR code. By capturing the finder pattern, the vendor scanning device may read the QR code and decode the data included in the QR code.

The QR code may expire within a predetermined timeframe after being scanned by the vendor scanning device. The predetermined timeframe may be thirty seconds, one minute, five minutes, an hour and/or any other suitable timeframe. As such, the methods may include decoding the QR code in order to store data included in the QR code.

The methods may include transmitting the QR code from the vendor scanning device to a central vendor platform. The central vendor platform may be a computing platform. The central vendor platform may be a network. The central vendor platform may include a processor and a memory. The central vendor platform may include any suitable computing components. The vendor scanning device may transmit the QR code to the computing platform via any suitable local connection, such as those described above.

Once the QR is transmitted to the central vendor platform, the methods may include extracting data from the QR code. The data may include customer information, transaction information and/or the payment amount. Customer information may include customer account information, customer device information and/or any other suitable information. Transaction information may include details relating to the transaction. Details relating to the transaction may include, but are not limited to, a date of the transaction, a time of the transaction and a location of the transaction.

The methods may include generating an encrypted data packet. After generating the encrypted data packets, the methods may include deleting the QR code from the central vendor platform. The encrypted data packet may store the extracted data. The methods may include inserting the encrypted data packet into an offline transaction queue. The offline transaction queue may be executing on the central vendor platform. The offline transaction queue may include a queue of all pending transactions that are unable to be completed due to the lack of internet connection. The queue may be updated based on a sequential order of incoming encrypted data packets.

When an internet connection is established, and/or reestablished, the methods may include transmitting the encrypted data packet to an entity-operated platform. The entity-operated platform may be a computing platform. The entity-operated computing platform may be operated by the entity. The entity-operated computing platform may be a network. The entity-operated computing platform may include a processor and a memory. The entity-operated computing platform may include any suitable computing components.

The methods may include receiving, at the entity-operated computing platform, the encrypted data packet. The methods may include using the data stored in the data packet to execute a transfer of funds between the customer account and the vendor. The transfer of funds may correspond to the payment amount. The methods may include executing a transfer of funds instruction. The transfer of funds instruction may instruct the entity-operated application to transfer the value of funds from the customer account to an account associated with the vendor. The methods may include reconciling the amount of funds included the customer account after the transfer of funds. The methods may include updating the customer account based on the amount of funds transferred to the vendor.

The methods may include using the QR code until the value of funds included in the transaction payload is depleted. In such embodiments, the QR code may be a multiple-use QR code. The multiple-use QR code may include a predetermined value of funds that may be used to complete offline transactions. The customer may use the multiple-use QR code to complete a plurality of offline transactions, until the predetermined value of funds has been depleted. The multiple-use QR code may be used a plurality of times. The multiple-use QR code may expire when the predetermined value of funds has been depleted. Once voided, the multiple-use QR code may not be able to be used to complete a transaction.

The methods may include expiring the QR code after a single use. In such embodiments, the QR code may be a single-use QR code. The single-use QR code may be a QR code that may expire once it has been used in a single offline transaction. The single-use QR code may include a predetermined value of funds. After being used in one offline transaction, the single-use QR code may return any remaining value of funds that were not used in the offline transaction from the predetermined value of funds back to the customer account. The remaining value of funds may be returned to the customer account after the customer has established/reestablished an internet connection.

The methods may include generating a plurality of QR codes. Each of the plurality of QR codes may be used in a single transaction. Multiple QR codes from the plurality of QR codes may be used in a single transaction. Each of the plurality of QR codes may be allotted a predetermined value of funds. In other embodiments, the plurality of QR codes may be connected to the customer account. The customer account may include a value of funds. The plurality of QR codes may be used until the amount of resources in the user account has been depleted. The customer may complete a plurality of transactions with the plurality of QR codes. One QR code, from the plurality of QR codes, may be used to execute each transaction included in the plurality of transactions.

The methods may include setting preset limits on the customer account. The preset limits may limit the value of funds that are transferable to the QR code. The limit may be a predetermined value of funds. The predetermined value of funds may be customer-selectable. The predetermined value of funds may be entity-selectable. The predetermined value of funds may be a combination of customer-selectable and entity-selectable. The customer may select a predetermined value of funds within a preset range. For example, a customer may select a predetermined value of funds from an entity-set range. The predetermined value of funds may be selected based on the total value of funds included in the customer account. The predetermined value of funds may change based on changes to the value of funds included in the customer account.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
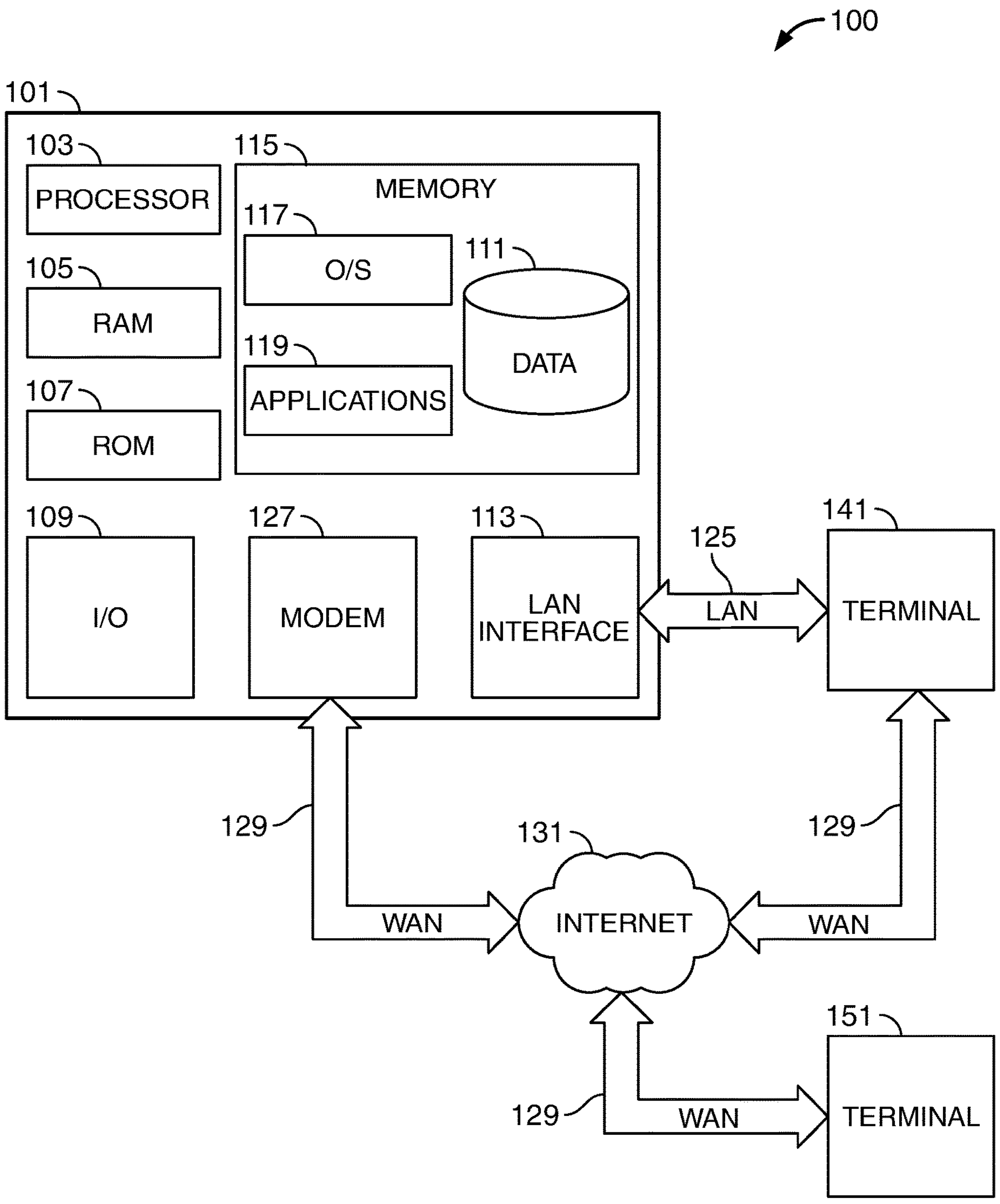
FIG. 1 shows an illustrative diagram in accordance with principles of the disclosure.

Systems, apparatus and methods for processing and executing offline transactions between a customer and a vendor may be provided. The apparatus may interact with a customer device.

The customer device may be a computing device. The customer device may be a mobile computing device. The customer device may be a smartphone, tablet, personal digital assistant ("PDA") and/or any other suitable mobile device. The customer device may be associated with the customer. The customer device may include a processor. The customer device may create an offline resource transfer system.

The apparatus may include an entity-operated application. The entity-operated application may be a software application. The entity-operated application may be operated by an entity. The customer account may be an identity/authenticator created for the customer. The customer account may link the customer, via customer credentials, to the entity. The customer credentials may include a username, a password and/or any other suitable customer credentials. The customer account may enable the customer to access customer specific settings, customer-related data and/or any other suitable entity-related data on the customer device.

The entity-operated application may execute on the processor. The entity-operated application may execute without using an internet connection.

The entity-operated application may receive a customer selection including a value of funds. The selected value of funds may be a value of funds selected from the customer account to be used in offline transactions. The entity-operated application may create a transaction payload based on the customer selected value of funds.

The customer account may set preset limits on the customer account. The preset limits may limit the value of funds that are transferable for offline transactions. The preset limit may be a predetermined value of funds. The predetermined value of funds may be customer-selectable. The predetermined value of funds may be entity-selectable. The predetermined value of funds may be a combination of customer-selectable and entity-selectable. The customer may select a predetermined value of funds within a preset range. For example, a customer may select a predetermined value of funds from an entity-set range. The predetermined value of funds may be selected based on the total value of funds included in the customer account. The predetermined value of funds may change based on changes to the value of funds included in the customer account.

The apparatus may include an artificial intelligence ("AI") model. The AI model may execute on the processor. The AI model may include progressive learning algorithms. The progressive learning algorithms may ingest training data. The progressive learning algorithms may analyze the ingested training data. The progressive learning algorithms may analyze the training data for correlations and patterns within the data. The progressive learning algorithms may use the analyzed correlations and patterns to generate outputs. The AI model may update the progressive learning algorithms based on the generated outputs curated/retrieved from the analyzed correlations and patterns.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and generate outputs.

The AI model may access a data log of the entity-operated application. The AI model may access the data log of the entity-operated application by retrieving it from a memory module associated with the customer device. The memory module may include random access memory ("RAM"), read only memory ("ROM"), electrically erasable programmable read-only memory ("EEPROM"), flash memory, cache memory and/or any suitable memory module.

The AI model may access a data log of the entity-operated application. The AI model may access the data log of the entity-operated application from a memory location associated with the customer device. The AI model may identify metadata of a most recent transaction in the data log. The AI model may retrieve, from the metadata, customer account information. Customer account information may include a customer account identification number, an entity routing number, a most recent value of funds included in the customer account and/or any suitable customer account information. The customer account information may have been used to execute the most recent transaction.

The AI model may use the customer account information and the transaction payload to generate a quick response ("QR") code. The AI model may encode the customer account information and the transaction payload in black and white pixels included in the QR code.

The QR code may expire after a single use. The QR code may be used until the value of funds included in the transaction payload is depleted. The QR code may be one of a plurality of QR codes, each of the QR codes may be used in a single transaction. The QR code may be any suitable QR code.

The customer device may initiate a transaction with the vendor without using an internet connection. The customer device may connect to a vendor scanning device via a local connection. Local connections may be initiated using Bluetooth, Wi-Fi, iBeacon™ and/or any other suitable protocol. Local connections may be initiated using wired connections. Local connections may be initiated using wireless connections.

The vendor scanning device may be a scanner, point of sale ("PoS") device, chip reader and/or any suitable computing device with scanning capabilities. The vendor scanning device may include a radio frequency identification ("RFID") reader, a near field communication ("NFC") reader and/or any contactless receiver that may enable wireless connections. The vendor scanning device may include an RFID tag, an NFC tag and/or any contactless transmitter that may enable wireless connections. The vendor scanning device may include universal serial bus ("USB") cables, micro-USB cables, USB-C cables and/or any other suitable connection cables that may enable wired connections. The vendor scanning device may include USB ports, micro-USB ports, USB-C ports and/or any other suitable connection ports that may enable wired connections.

The customer device may include an RFID reader, an NFC reader and/or any contactless receiver that may enable wireless connections. The customer device may include an RFID tag, an NFC tag and/or any contactless transmitter that may enable wireless connections. The customer device may include USB cables, micro-USB cables, USB-C cables and/or any other suitable connection cables that may enable wired connections. The customer may include USB ports, micro-USB ports, USB-C ports and/or any other suitable connection ports that may enable wired connections.

The vendor scanning device may create a local connection with the customer device via the above mentioned wired and/or wireless connections. Once a local connection has been established, the customer device may receive a payment amount from the vendor scanning device. The payment amount may be a portion of the value of funds to be transmitted to the vendor. The payment amount may be any suitable amount of resources to be transferred to the vendor in exchange for a product, service and/or any suitable return from the vendor.

After receiving the payment amount from the vendor scanning device, the customer device may determine whether the payment amount is greater than the value of funds included in the transaction payload. In response to determining that the payment amount is greater than the value of funds, the customer device may prevent the transaction from executing. In response to determining that the payment amount is less than or equal to the value of funds, the customer device may enable the transaction to be executed.

The customer device may update the transaction payload included in the QR code. The update may be based on the payment amount received from the vendor. The customer device may set aside the portion of the value of funds from the value of funds. The customer device may reencode the QR code based on the update.

The customer device may display the updated QR code.

The vendor scanning device may include a photosensitive sensor, a scanner, a camera and/or any other suitable scanning mechanism. The vendor scanning device may scan the QR code. The vendor scanning device may capture the encoded customer information and payment amount from the QR code.

The QR code may expire within a predetermined timeframe after being scanned by the vendor scanning device. The predetermined timeframe may be thirty seconds, one minute, five minutes, an hour and/or any other suitable timeframe. As such, the vendor scanning device may transmit the QR code to a central vendor platform. The central vendor platform may be a computing platform. The central vendor platform may be a network. The central vendor platform may include a processor and a memory. The central vendor platform may include any suitable computing components. The vendor scanning device may transmit the QR code to the computing platform via any suitable local connection, such as those described above.

The central vendor platform may extract data from the QR code. The data may include customer information, transaction information and/or the payment amount. Customer information may include customer account information, customer device information and/or any other suitable information. Transaction information may include details relating to the transaction. Details relating to the transaction may include, but are not limited to, a date of the transaction, a time of the transaction and/or a location of the transaction.

The central vendor platform may generate an encrypted data packet. The encrypted data packet may store the extracted data. The central vendor platform may insert the encrypted data packet into an offline transaction queue. The offline transaction queue may execute on the central vendor platform. The offline transaction queue may include a queue of all pending transactions that are unable to be completed due to the lack of internet connection. The queue may be updated based on a sequential order of incoming encrypted data packets.

When an internet connection is established, the central vendor platform may transmit the encrypted data packet to an entity-operated platform. The entity-operated platform may be a computing platform. The entity-operated computing platform may be operated by the entity. The entity-operated computing platform may be a network. The entity-operated computing platform may include a processor and a memory. The entity-operated computing platform may include any suitable computing components.

The entity-operated platform may receive the encrypted data packet. The entity-operated platform may decrypt the data packet. The entity-operated platform may use the data stored in the data packet to execute a transfer of funds between the customer and the vendor. The transfer of funds may correspond to the payment amount. The entity-operated platform may execute a transfer of funds instruction. The transfer of funds instruction may be an instruction to transfer the value of funds from the customer account to an account associated with the vendor. The entity-operated platform may reconcile the amount of funds included the customer account after the transfer of funds. The entity-operated platform may update the customer account based on the amount of funds transferred to the vendor.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone and/or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text and/or audio assistance files. The data stored in memory 115 may also be stored in cache memory and/or any other suitable memory.

I/O module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
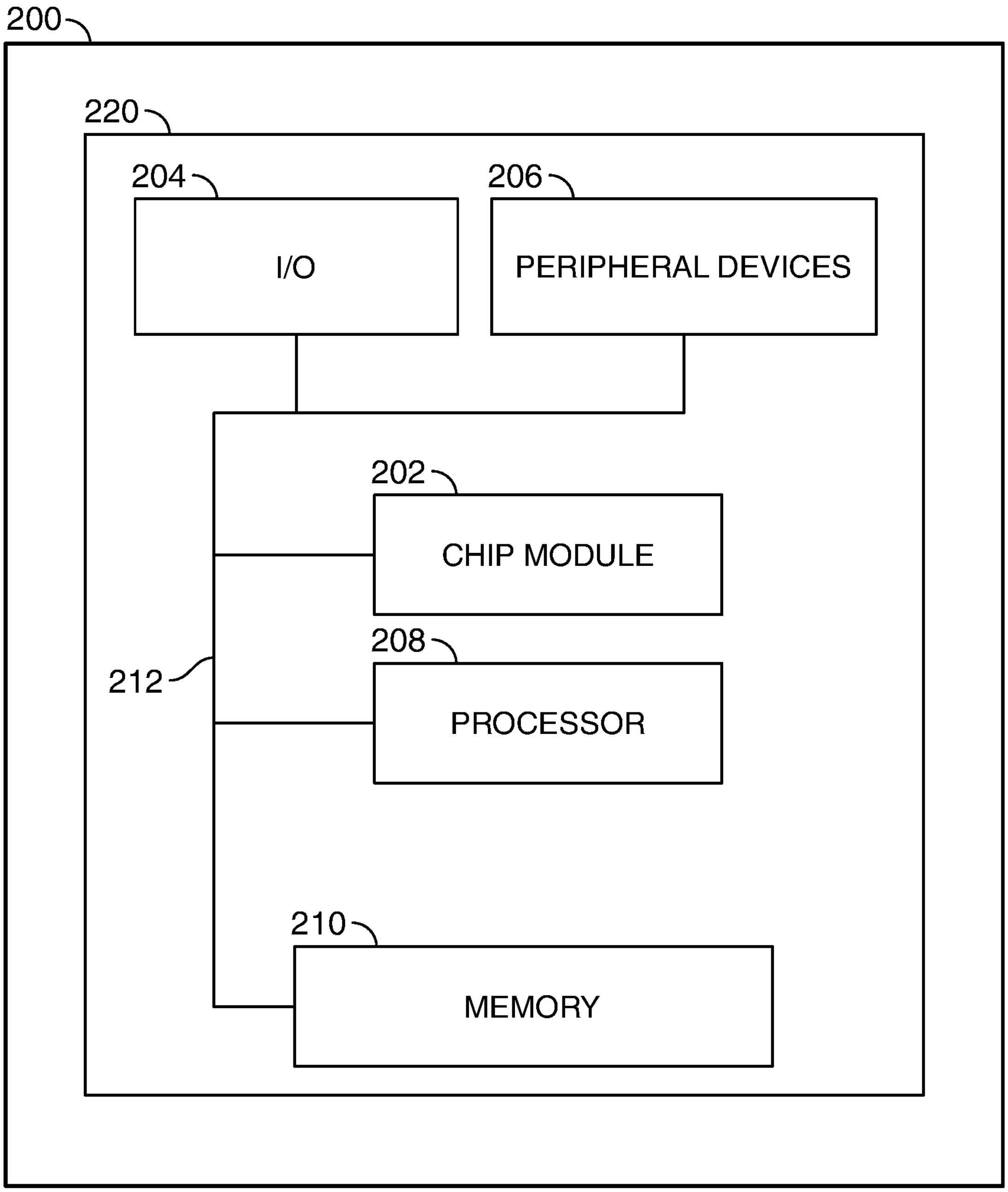
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
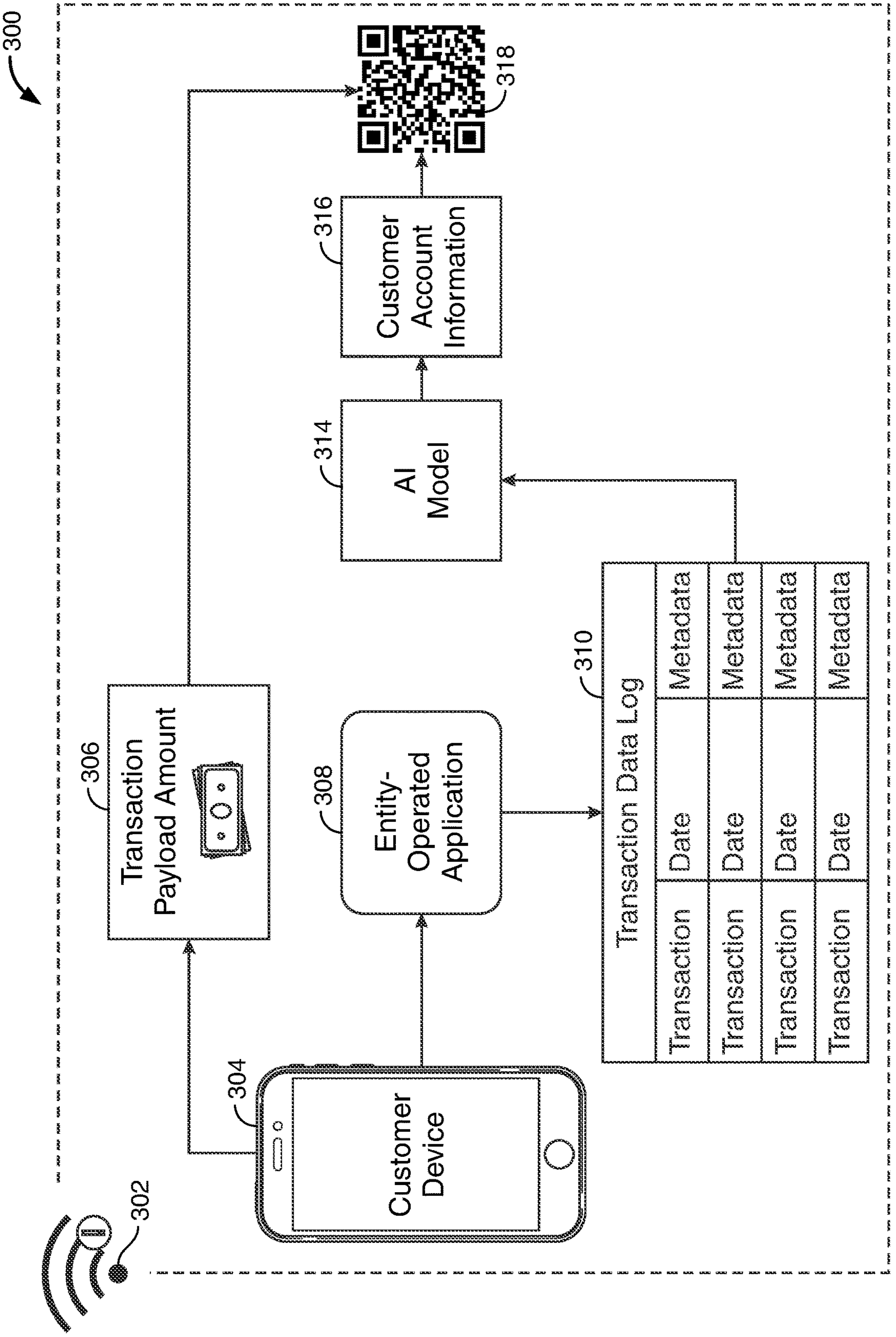
FIG. 3 shows yet another illustrative diagram in accordance with principles of the disclosure.

FIG. 3 shows illustrative offline transaction system 300. Offline transaction system 300 may include customer device 304. Customer device 304 may be a mobile computing device. Customer device 304 may be a smartphone, laptop, tablet, personal digital assistant ("PDA") and/or any other suitable mobile computing device.

Customer device 304 may execute entity-operated application 308. Entity-operated application 308 may be a software application. Entity-operated application 308 may be operated by an entity. A customer associated with customer device 304 may access a customer account 512 (shown in FIG. 5) using entity-operated application 308.

Customer device may be in disconnected state 302. When customer device 304 is in disconnected state 302, customer device 304 may not have access to an internet connection. In disconnected state 302, customer device 304 may generate quick response ("QR") code 318 to be used to initiate offline transactions. Customer device 304 may generate QR code 318 using the customer account.

Customer device 304 may execute artificial intelligence ("AI") model 314. AI model 314 may access transaction data log 310. Transaction data log 310 may be a data log of previous transactions executed on customer account 512 via entity-operated application 308. Transaction data log 310 may include metadata of the previous transactions. The metadata may include customer account information 316. Customer account information 316 may include a routing number associated with the entity, an account number associated with the customer account, a value of funds most recently determined to be in customer account 512 and/or any other suitable customer account information. Customer account information 316 may be used to generate QR code 318.

The customer may select via entity-operated application 308, transaction payload amount 306. Transaction payload amount 306 may be a selected value of funds to be transferred to QR code 318. Transaction payload amount 306 may be a preset value of funds. Transaction payload amount 306 may be a customer-selected value of funds.

Entity-operated application 308 may generate QR code 318 using customer account information 316, transaction payload amount 306 and computing resources from customer device 304. Entity-operated application 308 may generate QR code 318 by decoding customer account information 316 and transaction payload amount 306 into data fields (the pattern of black and white pixels) of QR code 318.

Figure 4:
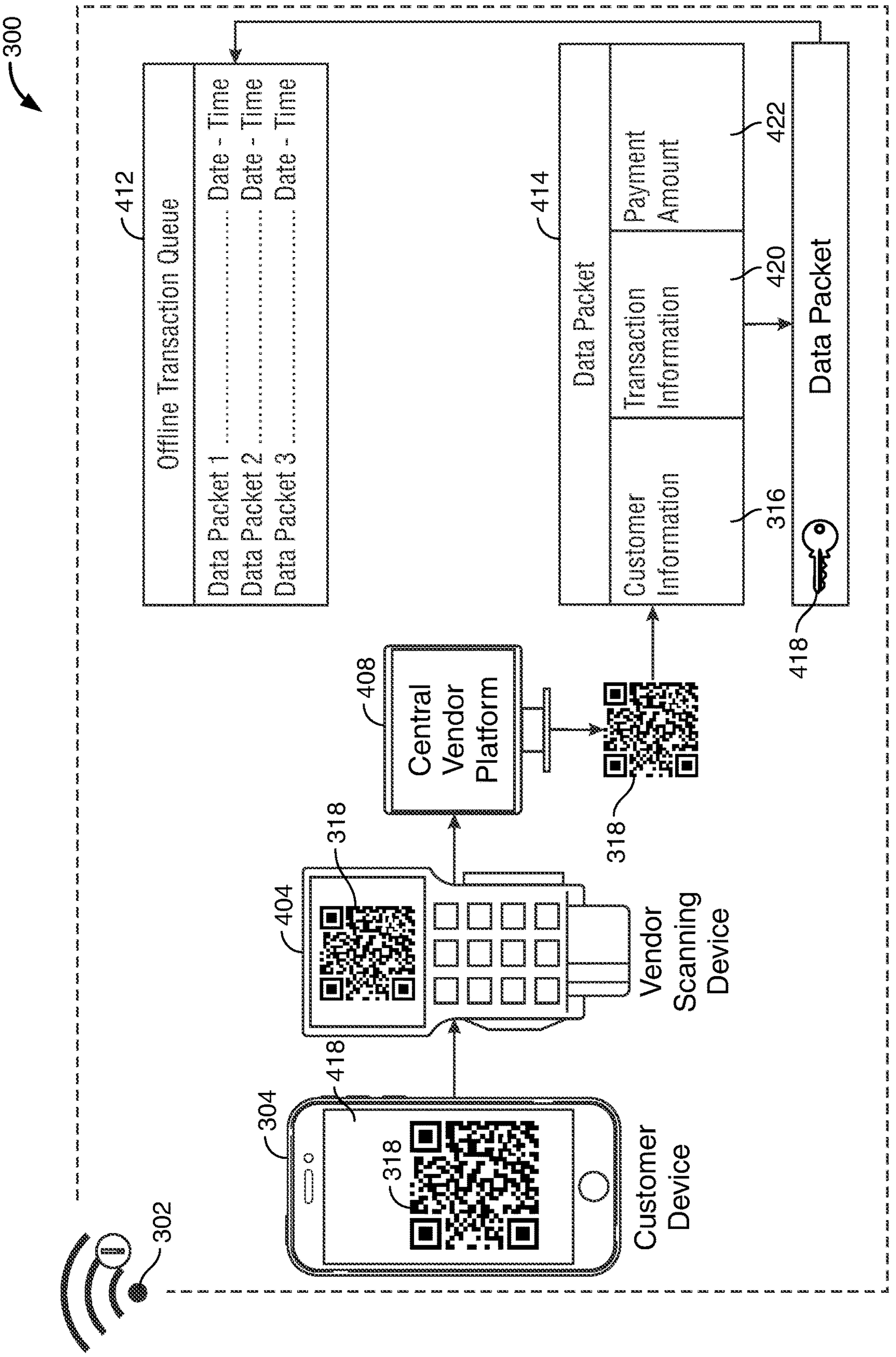
FIG. 4 shows yet another illustrative diagram in accordance with principles of the disclosure.

FIG. 4 shows a continuation of offline transaction system 300. Customer device 304 may display QR code 318 on user interface ("UI") 418.

The customer may initiate a transaction with a vendor. The transaction may be initiated in disconnected state 302. Vendor scanning device 404 may be any suitable computing device that can be used for scanning. After the transaction is initiated, vendor scanning device 404 may scan QR code 318. After scanning QR code 318, vendor scanning device 404 may transmit QR code 318 to central vendor platform 408. Central vendor platform 408 may be a computing system/network including a processor, a memory and any and/or other suitable computing platform components.

Central vendor platform 408 may decode QR code 318. Central vendor platform 408 may decode QR code 318 by extracting customer account information 316 from QR code 318. Central vendor platform 408 may create data packet 414. Data packet 414 may correspond to the transaction initiated between customer device 304 and the vendor.

Data packet 414 may include customer account information 316. Data packet 414 may include transaction information 420. Transaction information 420 may be retrieved from vendor scanning device 404. Transaction information 420 may include a transaction time, transaction location, vendor related information and/or any other suitable transaction related information. Data packet 414 may include payment amount 422. Payment amount 422 may be a value of funds to be transferred to the vendor as part of the transaction. Central vendor platform 408 may encrypt data packet 414, creating encrypted data packet 418.

Central vendor platform 408 may transmit encrypted data packet 418 to offline transaction queue 412. Offline transaction queue 412 may be a software/firmware-based module executing on central vendor platform 408. Offline transaction queue 412 may store data packets sequentially, or in any other suitable manner, as they are received, until central vendor platform 408 is able to establish an internet connection.

Figure 5:
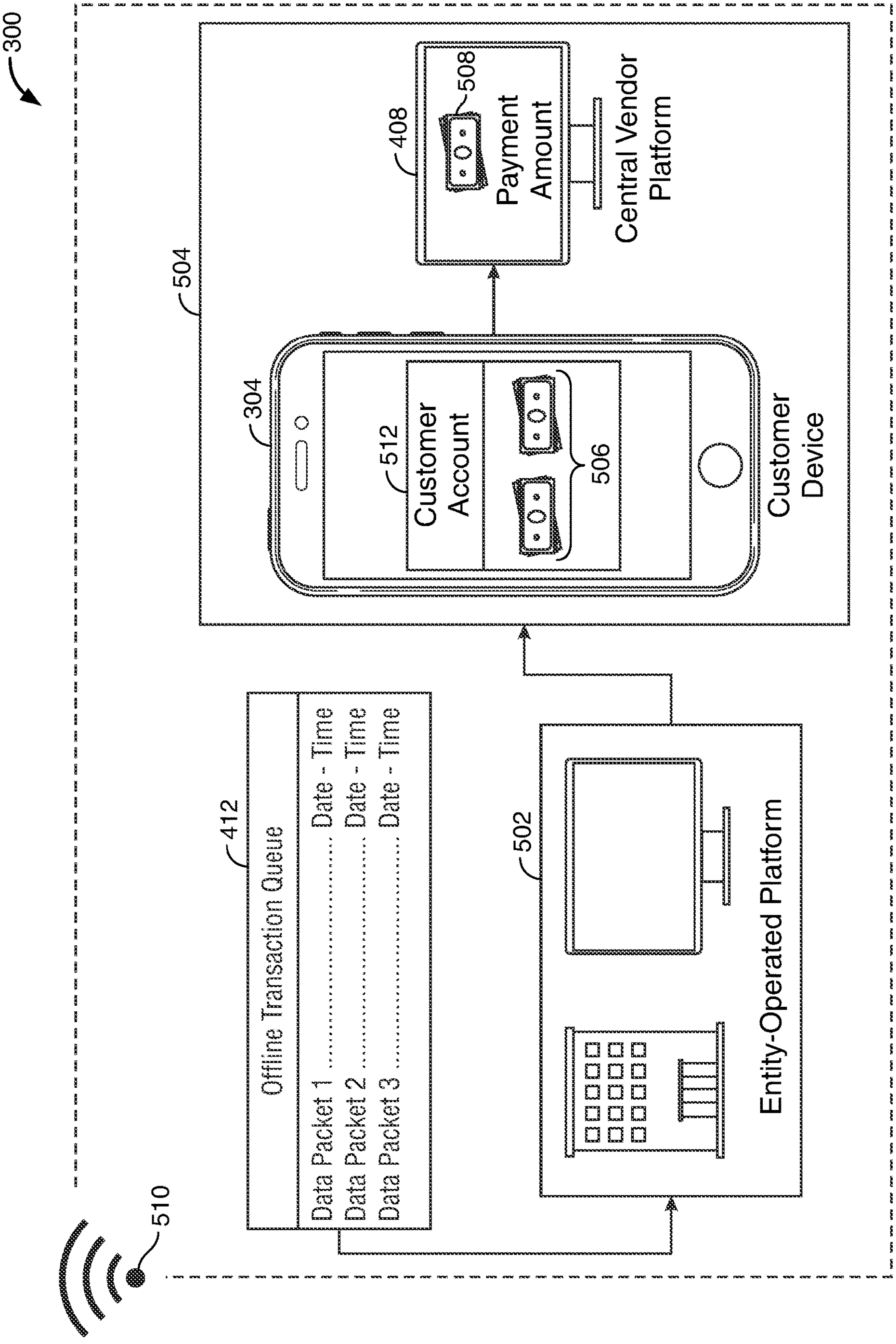
FIG. 5 shows yet another illustrative diagram in accordance with principles of the disclosure.

FIG. 5 shows a continuation of offline transaction system 300.

After a period of time, central vendor platform 408 may be in connected state 510. When central vendor platform 408 is in connected state 510, central vendor platform 408 may establish an internet connection. Once an internet connection has been established central vendor platform 408 may process the transaction.

Once an internet connection is established, central vendor platform 408 may transmit encrypted data packet 418 from offline transaction queue 412 to entity-operated platform 502. Entity-operated platform 502 may be a computing system/network including a processor, a memory and any and/or other suitable computing platform components. Entity-operated platform 502 may be operated by the entity operating entity-operated application 308.

After receiving encrypted data packet 418, entity-operated platform 502 may decrypt encrypted data packet 418. Using customer account information 316, transaction information 420 and payment amount 422 to initiate transfer 504. Transfer 504 may include transferring a value of funds 508 to central vendor platform 408. Value of funds 508 may be a value of funds that is equivalent to payment amount 422. Transfer 504 may include transferring value of funds 508 from customer account 512. Customer account 512 may include total value of funds 506. Value of funds 508 may be a portion of value of funds 508. After transferring value of funds 508 to central vendor platform 408, customer account 512 may be reconciled by updating total value of funds 506 to reflect transfer 504.

Figure 6A:
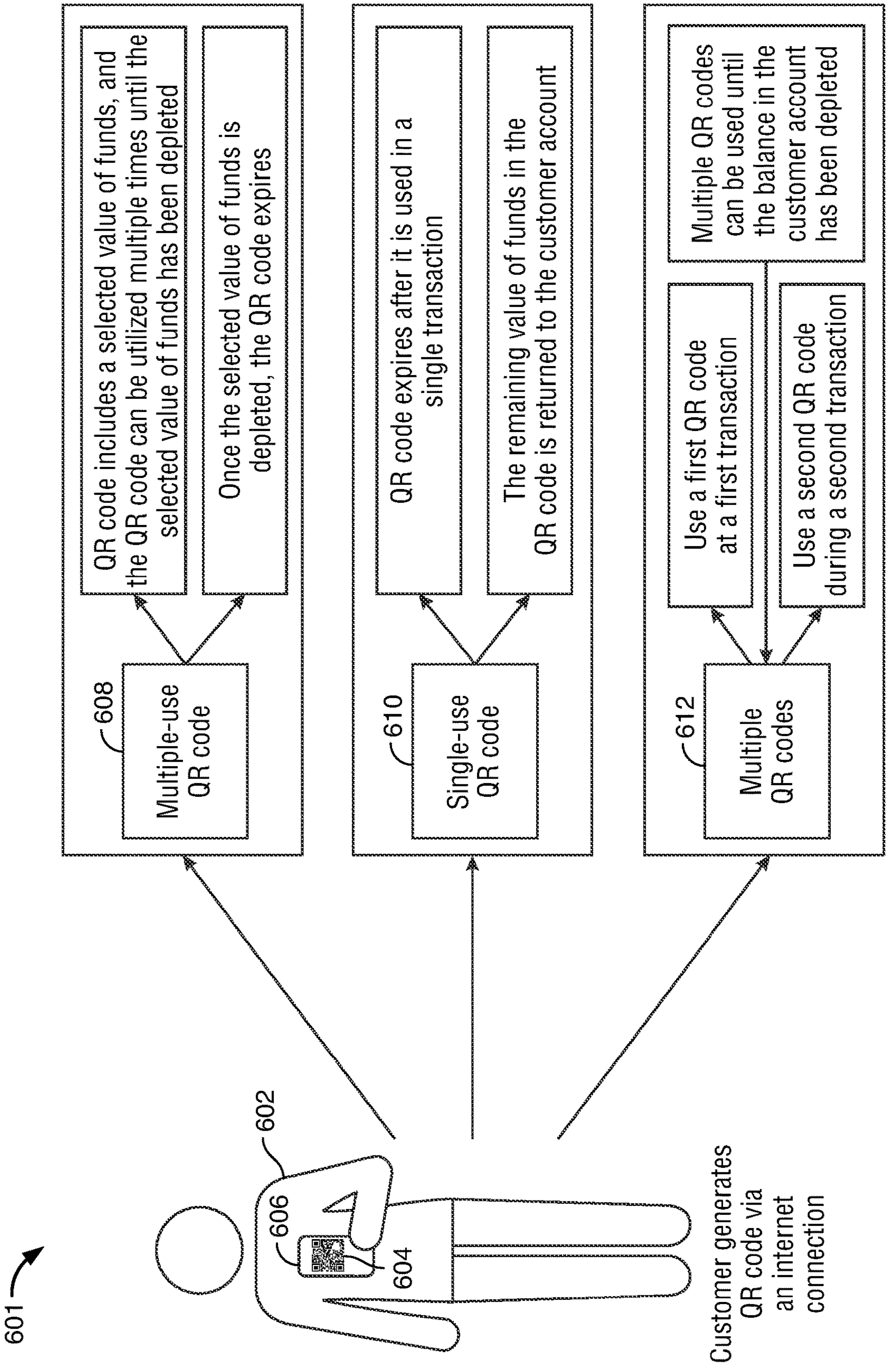
FIGS. 6A and 6B show yet another illustrative diagram in accordance with principles of the disclosure.

FIG. 6A shows online QR code generation process 601. Online QR code generation process 601 may have one or more features in common with offline transaction system 300. Customer 602 may generate QR code 604 using an internet connection. Customer device 606 may generate QR code 604 while having an established internet connection.

QR code 604 may be multiple-use QR code 608. Multiple-use QR code 608 may include a selected value of funds. Multiple-use QR code 608 may be used in one or more transactions until the selected value of funds has been depleted. Once the selected value of funds has been depleted, multiple-use QR code 608 may expire.

QR code 604 may be single-use QR code 610. Single-use QR code 610 may expire after it is used to initiate a single transaction. Any remaining value of funds from the selected value of funds included in single-use QR code 610 may be returned to the customer account.

QR code 304 may include multiple QR codes 612. Multiple QR codes 612 may include a plurality of QR codes. Multiple QR codes 612 may be used until the value of funds in the customer account has been depleted. Multiple QR codes 612 may include a first QR code to be used in a first transaction. Multiple QR codes 612 may include a second QR code to be used in a second transaction. Multiple QR codes 612 may include a plurality of QR codes to be used in one or more transactions.

Figure 6B:
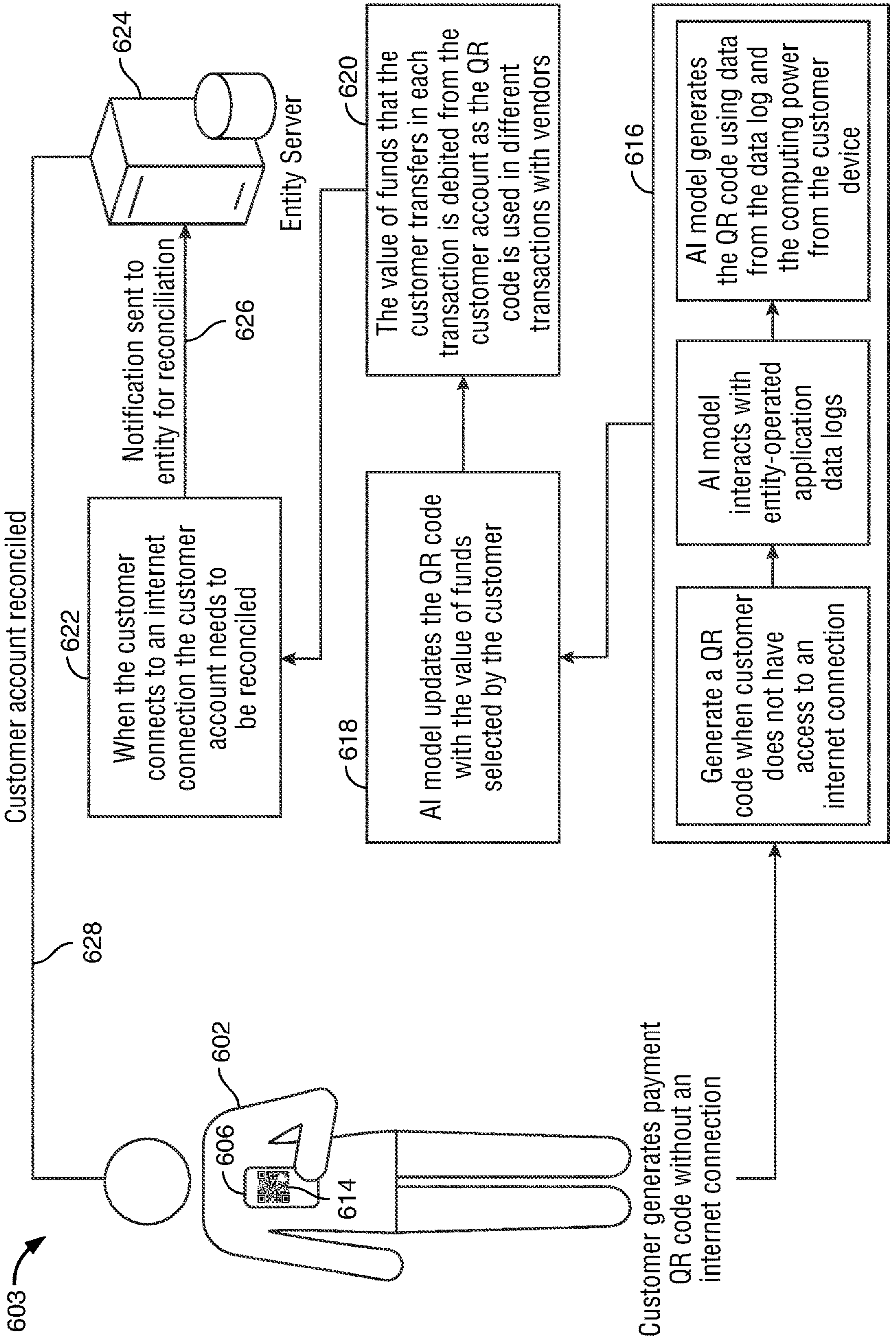

FIG. 6B shows offline QR code generation process 603. Offline QR code generation process 603 may have one or more features in common with offline transaction system 300. Customer 602 may generate QR code 614 without using an internet connection. Customer device 606 may generate QR code 614 without having an established internet connection.

At step 616, entity-operated application generates QR code 614 using an AI model. The AI model may generate the QR code using information retrieved from data logs of a customer account executing on the entity-operated application.

At step 618, the AI model may update the QR code with a value of funds selected by the customer to be used in upcoming transactions.

At step 620, the value of funds that the customer transfers in each transaction may be debited from the customer account as the QR code is used in different transactions.

At step 622, when customer device 606 establishes an internet connection, the customer account may expect to be reconciled.

At step 626, a notification may be sent to entity server 624 for reconciliation of the customer account.

At step 628, the customer account may be reconciled.

Figure 7:
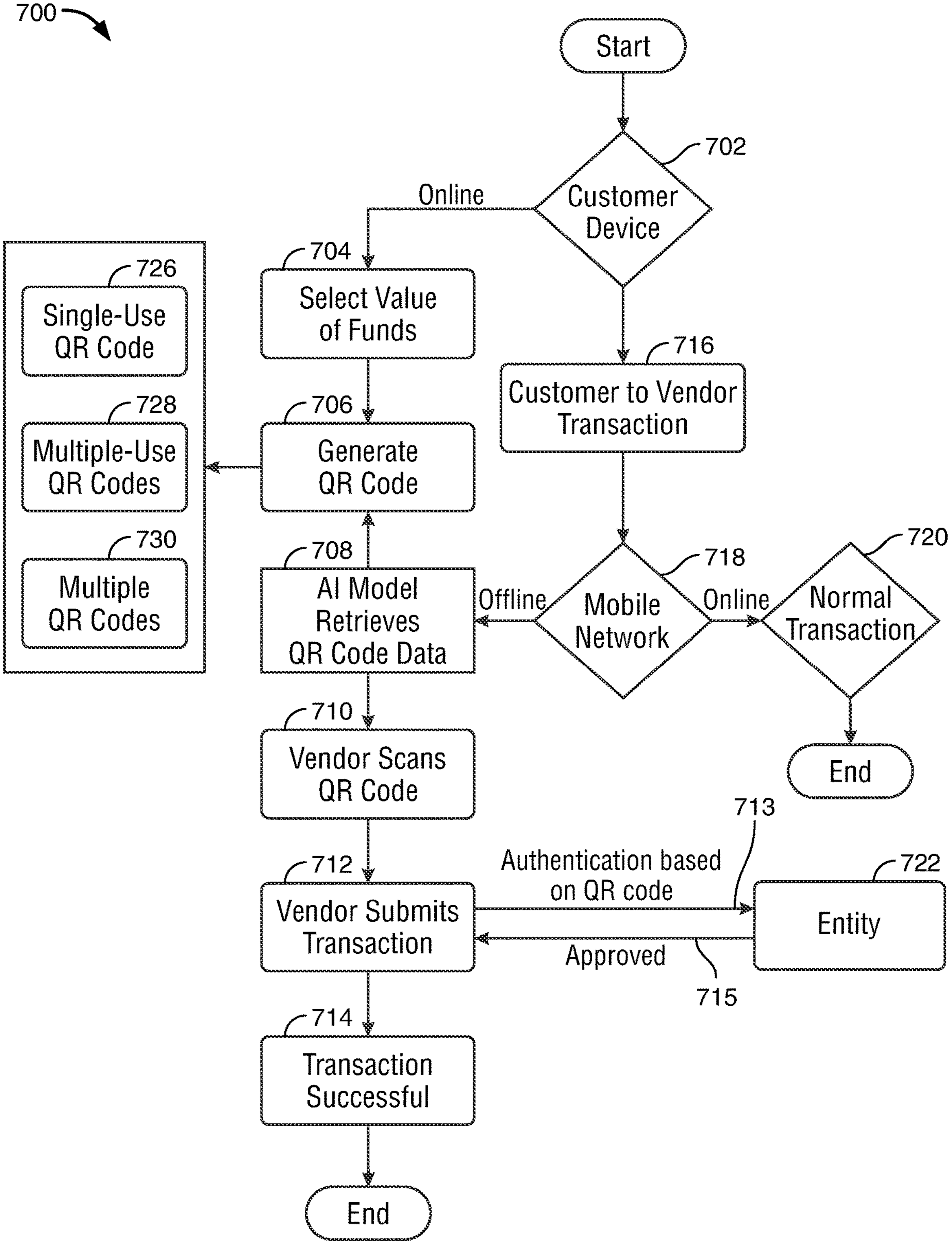
FIG. 7 shows yet another illustrative diagram in accordance with principles of the disclosure.

FIG. 7 shows illustrative transaction process 700. Transaction process 700 may have one or more features in common with one or more of offline transaction system 300, online QR code generation process 601 and/or offline QR code generation process 603.

When customer device 702 is online, a customer may select a value of funds at step 704. At step 706, the selected value of funds may be used to generate a QR code. The QR code may be single-use QR code 726, multiple-use QR code 728 and/or multiple QR codes 730.

Customer device 702 may initiate a transaction with a vendor at step 716. In the event that customer device 702 is connected to mobile network 718, a normal online transaction may occur at step 720. In the event that customer device 702 is not connected mobile network 718, an AI model may retrieve the QR code at step 708. At step 710, the vendor may scan the QR code. After the vendor scans the QR code, the vendor may submit the transaction to entity 722, at step 712. At step 713, the vendor may initiate an authentication of the transaction based on the QR code. At step 715, entity 722 may approve the transaction. After the approval from entity 722, the transaction may be processed at step 714.

Thus, methods and apparatus for DYNAMIC PAYMENT QUICK RESPONSE ("QR") CODES are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. Apparatus for processing and executing offline transactions between a customer and a vendor, the apparatus comprising:

an entity-operated application configured to execute on a processor of a customer device, without using an internet connection, the entity-operated application configured to:

receive a customer selection including a value of funds; and create a transaction payload including the value of funds;

an artificial intelligence ("AI") model including progressive learning algorithms, the AI model configured to execute on the processor, the AI model configured to:

access a data log of the entity-operated application;

identify metadata of a most recent transaction in the data log;

retrieve, from the metadata, customer account information; and encode the customer account information and the transaction payload in black and white pixels of a quick response ("QR") code;

the customer device further configured to initiate a transaction with the vendor without using an internet connection, the customer device configured to:

connect to a vendor scanning device via a local connection;

receive from the vendor scanning device a payment amount to be transmitted to the vendor, the payment amount being a portion of the value of funds;

update the transaction payload included in the QR code based on the payment amount, the update configured to set aside the portion of the value of funds from the value of funds; and display the QR code;

the vendor scanning device further including photosensitive sensor, the vendor scanning device configured to:

scan the QR code using the photosensitive sensor;

transmit the QR code to a central vendor platform;

the central vendor platform including a processor and a memory location, the central vendor platform configured to:

extract data from the QR code including customer information, transaction information and the payment amount;

generate an encrypted data packet that stores the extracted data;

insert the encrypted data packet into an offline transaction queue; and transmit the encrypted data packet to an entity-operated platform when an internet connection is established; and the entity-operated platform configured to:

receive the encrypted data packet; and use the data stored in the data packet to execute a transfer of funds between the customer and the vendor corresponding to the payment amount.

2. The apparatus of claim 1 wherein the QR code is configured to expire after a single use.

3. The apparatus of claim 1 wherein the QR code is configured to be used until the value of funds included in the transaction payload is depleted.

4. The apparatus of claim 1 wherein the QR code is one of a plurality of QR codes, each of the QR codes being configured to be used in a single transaction.

5. The apparatus of claim 1 wherein the customer account includes preset limits, the preset limits limiting the value of funds that are transferable to the QR code with a predetermined value of funds.

6. The apparatus of claim 1 wherein the customer device is further configured to:

after receipt of the payment amount, determine, if the payment amount is greater than the value of funds included in the transaction payload; and in response to a determination that the payment amount is greater than the value of funds, prevent the transaction from being executed.

7. The apparatus of claim 1 wherein the QR code is configured to expire within a predetermined timeframe after being scanned by the vendor scanning device.

* * * * *